United States Patent
Shim et al.

(10) Patent No.: US 8,235,827 B2
(45) Date of Patent: Aug. 7, 2012

(54) COMPLIANT JOINT

(75) Inventors: Young Bo Shim, Seoul (KR); Ja Woo Lee, Seoul (KR); Youn Baek Lee, Suwon-si (KR); Jeong Hun Kim, Suwon-si (KR); Yeon Taek Oh, Yongin-si (KR); Soo Sang Yang, Suwon-si (KR); Hyun Seok Yang, Seoul (KR); Dong Jun Hyun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 12/320,359

(22) Filed: Jan. 23, 2009

(65) Prior Publication Data

US 2009/0233720 A1 Sep. 17, 2009

(30) Foreign Application Priority Data

Mar. 14, 2008 (KR) ........................ 10-2008-0023652

(51) Int. Cl.
  *F16D 3/62* (2006.01)
(52) U.S. Cl. ............................. 464/29; 464/38; 464/161
(58) Field of Classification Search .................... 464/37, 464/38, 160, 161, 29; 74/490.01, 490.05; 901/28, 29, 49; 403/327; 173/93.5; *B25J 17/02, B25J 19/06; F16D 3/06, 7/06*
See application file for complete search history.

(56) References Cited

U.S. PATENT DOCUMENTS

| | | | | |
|---|---|---|---|---|
| 3,877,259 A | * | 4/1975 | Bishop | 464/37 |
| 4,717,003 A | * | 1/1988 | McCormick et al. | 192/56.32 |
| 4,741,642 A | * | 5/1988 | Carlton | 403/59 |
| 5,040,915 A | * | 8/1991 | Stuart et al. | 403/322.3 |
| 6,069,415 A | * | 5/2000 | Little et al. | 307/326 |
| 7,823,483 B2 | * | 11/2010 | Yamada | 81/54 |
| 2006/0234798 A1 | * | 10/2006 | Chang | 464/38 |
| 2008/0190224 A1 | * | 8/2008 | Song et al. | 74/40 |

FOREIGN PATENT DOCUMENTS

DE 3003990 A * 8/1981
KR 10-2008-0014343 2/2008

* cited by examiner

*Primary Examiner* — Gregory Binda
*Assistant Examiner* — Matthieu Setliff
(74) *Attorney, Agent, or Firm* — Staas & Halsey LLP

(57) ABSTRACT

Disclosed is a compliant joint achieving passive compliance. The compliant joint includes a housing and a rotating member mutually rotatably provided; and a cam provided between the housing and the rotating member, and connected to the housing and the rotating member respectively. The cam is connected to the rotating member to rotate together with the rotation of the rotating member, or be independent of the rotating member so as to move in the axial direction of the rotating member separately from the rotating member. The cam is connected to the housing such that the cam can maintain the connection with the housing when external force below a designated value is applied to the rotating member, and release the connection with the housing in the case that external force more than the designated value is applied to the rotating member.

17 Claims, 9 Drawing Sheets

COMPLIANT JOINT

CROSS-REFERENCE TO RELATED APPLICATIONS

This application claims the benefit of Korean Patent Application No. 2008-0023652, filed Mar. 14, 2008, in the Korean Intellectual Property Office, the disclosure of which is incorporated herein-by reference.

BACKGROUND

1. Field

The present invention relates to a compliant joint, and more particularly, to a compliant joint, which provides flexibility to a robot when external force greater than a designated value is applied to the robot, and allows the robot to maintain rigidity when external force below the designated value is applied to the robot.

2. Description of the Related Art

Industrial robots have been widely used in production lines to carry out correct operations without manipulation or control by human beings. For example, a robot used in the automobile industry carries out various operations, such as carrying a frame of a vehicle or welding, without interaction with a human being.

On the other hand, intellectual service robots interact with human beings and carry out operations in a human living space. For example, a cleaning robot detects a pollution level in an indoor space and cleans the indoor space, thus providing services required by a human being. However, the intellectual service robots may collide with an unexpected obstacle while carrying out operations. That is, the intellectual service robots may collide with a person and apply an impact upon the person, thus generating an unexpected accident to the person. Therefore, it is important to design an intellectual service robot, which can guarantee the safety of a human being so as to interact with the human being.

Flexibility is applied to intellectual service robots (hereinafter, referred to as "robots") so as to prevent a person from being affected by an impact when the robots apply the impact to the person. This technical solution is referred to as robot compliance. That is, a method, in which flexibility is applied to a robot so as to prevent a person from being injured when the robot collides with the person is required. According to this method, an external force greater than a designated value is transmitted to the robot, and the robot maintains rigidity so as to smoothly carry out an operation when external force below the designated value is transmitted to the robot. This is referred to as robot compliance.

There are an active method and a passive method to apply compliance to robots. In the active method, a controller senses a feedback signal of a force/torque sensor installed in a robot so as to properly cope with force or impact applied from the outside. In the passive method, safety is achieved by a mechanical mechanism using elements, such as springs and dampers.

The active method uses the sensor and controls the feedback signal, thus being limited in achieving safety. For example, when a vision sensor is used, the vision sensor has a low resolving power, and thus cannot promptly cope with external impact when the external impact is applied to the vision sensor at a high speed. Further, when noise is mixed with a signal of the sensor and external impact greater than a controllable bandwidth is applied, the vision sensor cannot cope with this situation.

However, the passive method does not use a special sensor and absorbs impact through a mechanical mechanism, thus having a high reaction velocity and no danger of errors. Thus, the development of a mechanism, which maintains the mutual safety of a human being and a robot using only the passive method, is required. That is, a plan for intrinsically safely designing and manufacturing a robot system using passive compliance is required.

Korean Patent Laid-open Publication No. 10-2008-0014343 discloses a safety unit achieving passive compliance and a safety device with the same. The safety unit uses multiple links and thus has a complicated structure, and is weak when load in the perpendicular direction of a plane, on which the multiple links are operated, is applied.

SUMMARY

Accordingly, it is an aspect of the present invention to provide a compliant joint, which has a simple and strong structure and achieves passive compliance of a robot such that the compliant joint can provide flexibility to the robot when external force greater than a designated value is applied, and allows the robot to maintain rigidity when external force below the designated value is applied.

Additional aspects and/or advantages will be set forth in part in the description which follows and, in part, will be apparent from the description, or may be learned by practice of the invention.

The foregoing and/or other aspects of the present invention are achieved by providing a compliant joint comprising a housing; a rotating member rotatably installed in the housing; and a cam selectively maintaining a connection between the housing and the rotating member or releasing the connection between the housing and the rotating member, wherein the cam is connected to the rotating member such that the cam is selectively dependent on the rotating member so as to rotate together with the rotation of the rotating member, or is independent of the rotating member so as to move in an axial direction of the rotating member separately from the rotating member; and the cam is connected to the housing such that the cam can maintain the connection with the housing if an external force below a designated value is applied to the rotating member, and release the connection with the housing if the external force more than the designated value is applied to the rotating member.

The cam is inserted into the rotating member.

The cam may include transmission shafts inserted into the rotating member, and the rotating member includes mounting holes receiving the transmission shafts.

The transmission shafts and the mounting holes may be respectively separated from the centers of rotation of the cam and the rotating member by a designated distance.

Further comprising a plurality of the transmission shafts and the mounting holes may be respectively provided in plural numbers.

The cam may include rollers connected to the housing, and the housing may include cam guide units selectively connected to or separated from the rollers.

Each of the cam guide units may include a landing groove, into which a corresponding one of the rollers is inserted; so that the rotating member and the housing may be connected.

The landing groove may be depressed.

Each of the cam guide units may include a rolling part, on which a corresponding one of the rollers roll; to release the connection between the cam and the housing.

Each of the cam guide units may include a stopper restricting the movement of a corresponding one of the rollers, so that the rotation of the cam may be restricted and thus the rotation of the rotating member may be restricted.

The rolling parts of the cam guide units each have an arc shape such that the cam can rotate together with the rotation of the rotating member and move in the axial direction of the rotating member separately from the rotating member.

Elastic members may be installed between the cam and the rotating member so as to adhere the cam closely to the rotating member.

Alternatively, the elastic members may be installed between the cam and the housing so as to adhere the cam closely to the housing.

The elastic members may include compressed coil springs.

Electromagnets may be installed between the cam and the rotating member; and a control unit, for regulating current applied to the electromagnets so as to regulate external force required to release the connection between the rotating member and the housing, may be provided.

The foregoing and/or other aspects of the present invention are also achieved by providing a compliant joint including a rotating member, a housing; and a cam provided between the housing and the rotating member, and connected to the housing and the rotating member respectively, wherein the cam is connected to the rotating member such that the cam can rotate together with the rotation of the rotating member and move in an axial direction of the rotating member separately from the rotating member; and the cam is selectively connected to the housing such that the connection between the cam and the housing can be maintained under an external force below a designated value and be released if the external force is more than the designated value.

The cam may include transmission shafts and the rotating member includes mounting holes, and the cam and the rotating member may be connected by inserting the transmission shafts into respective ones of the mounting holes.

BRIEF DESCRIPTION OF THE DRAWINGS

These and/or other aspects and advantages will become apparent and more readily appreciated from the following description of the embodiments, taken in conjunction with the accompanying drawings in which.

DETAILED DESCRIPTION OF EMBODIMENTS

Figure 1:
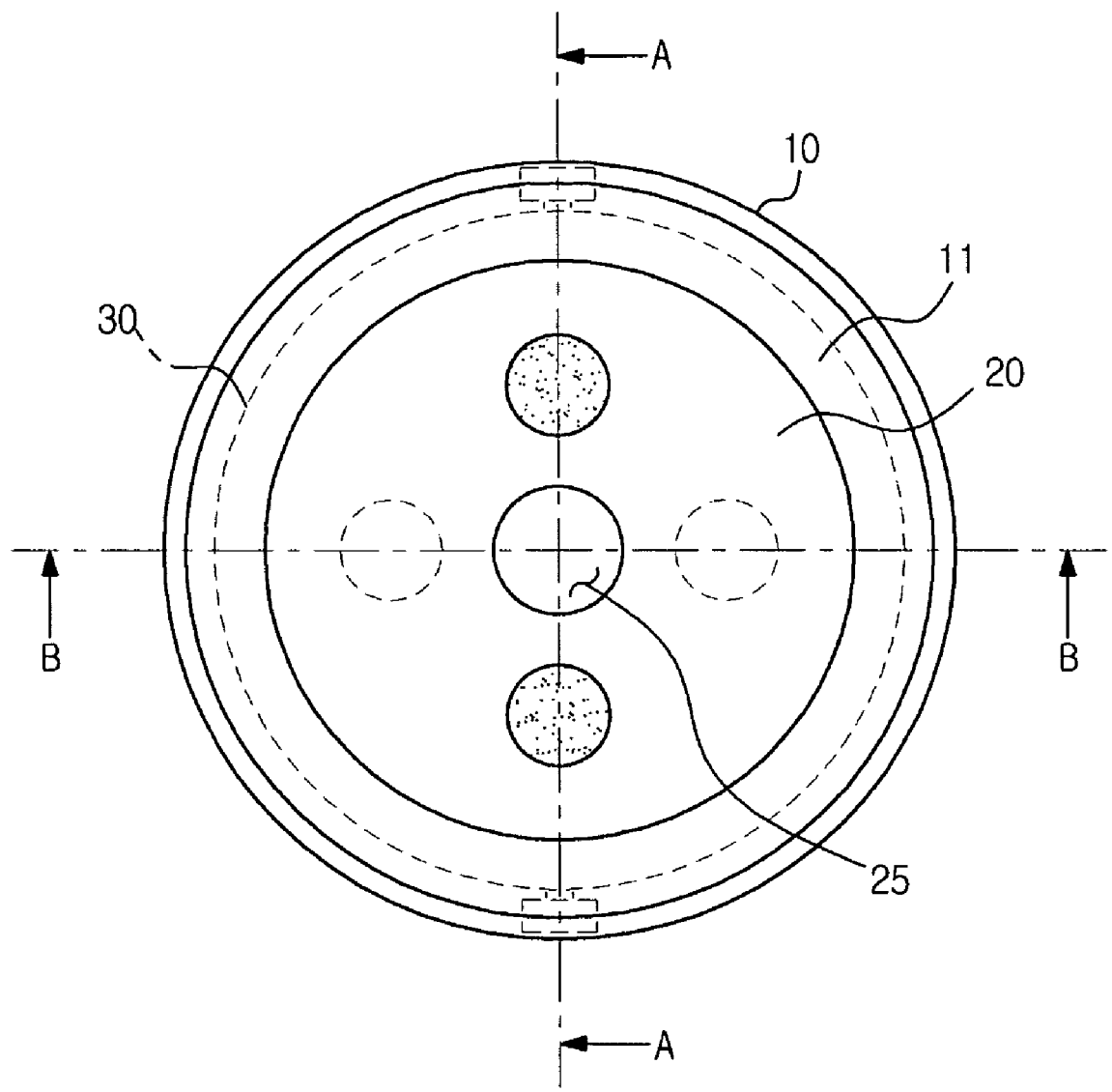
FIG. 1 is a plan view of a compliant joint in accordance with the embodiments of the present invention.

Reference will now be made in detail to the embodiments, examples of which are illustrated in the accompanying drawings, wherein like reference numerals refer to like elements throughout. The embodiments are described below to explain the present invention by referring to the figures.

FIG. 1 is a plan view of a compliant joint in accordance with the embodiments of the present invention.

As shown in FIG. 1, the compliant joint includes a housing 10 having a loop-shaped cross section, and a rotating member 20 rotatably installed in the housing 10. Bearings 11 are installed between the inner surface of the housing 10 and the outer surface of the rotating member 20 such that the housing 10 and the rotating member 20 can be mutually rotated. Further, a cam 30 is installed between the housing 10 and the rotating member 20, and thus connects the housing 10 and the rotating member 20 so as to limit the mutual rotation of the housing 10 and the rotating member 20 and removes the connection of the housing 10 and the rotating member 20 so as to allow the housing 10 and the rotating member 20 to be mutually rotated.

Figure 2:
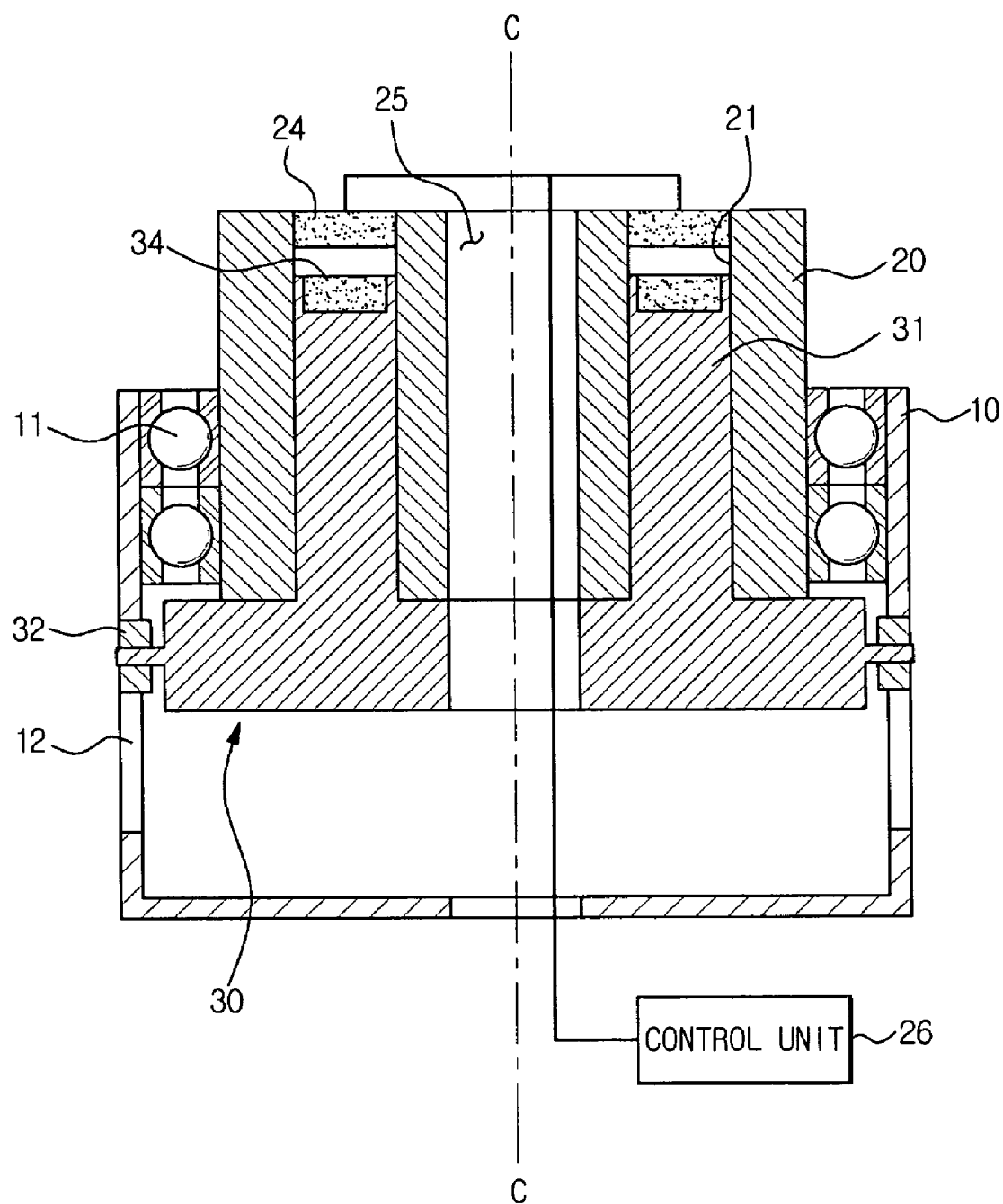
FIG. 2 is a cross-sectional view taken along the line A-A of FIG. 1.

FIG. 2 is a cross-sectional view taken along the line A-A of FIG. 1.

FIG. 2 illustrates a state of the compliant joint, in which the rotating member 20 and the cam 30 are connected and the housing 10 and the cam 30 are connected.

First, the connecting structure between the rotating member 20 and the cam 30 will be described. The cam 30 includes transmission shafts 31 protruding upwardly, and mounting holes 21, into which the transmission shafts 31 are inserted, are formed through the rotating member 20. The transmission shafts 31 are inserted into the mounting holes 21, and thus the cam 30 and the rotating member 20 are connected by a simple insertion method. Although this embodiment describes the transmission shafts 31 having a circular cross section, the transmission shafts 31 may have a triangular or rectangular cross section.

Then, the operation of the cam 30 and the rotating member 20 will be described. The cam 30 depends on the rotating member 20 and rotates together with the rotation of the rotating member 20, and simultaneously moves in the axial direction of the rotating member 20 separately from the rotating member 20.

Since the transmission shafts 31 are separated from the center (C) of rotation of the cam 30 by a designated distance and the mounting holes 21 are separated from the center (C) of rotation of the rotating member 20 by the designated distance, in the case that the rotating member 20 rotates, the cam 30 depends on the rotating member 20 and rotates together with the rotation of the rotating member 20. In the case that the transmission shafts 31 and the mounting holes 21 are formed at the centers (C) of rotation of the cam 30 and the rotating member 20, although the rotating member 20 rotates, the cam 30 does not rotate. In this case, a separate device rotating the cam 30 together with the rotation of the rotating member 20 is required.

When the cam 30 moves in the axial direction of the rotating member 20, the cam 30 moves independently of the rotating member 20. Since the transmission shafts 31 are simply inserted into the mounting holes 21, the cam 30 can reciprocate up and down. Here, the rotating member 20 does not move up and down.

Next, the connecting structure between the cam 30 and the housing 10 will be described. The cam 30 includes rollers 32 protruding in the lateral direction, and cam guide units 12 contacting the rollers 32 are formed on the wall of the housing 10.

Figure 3:
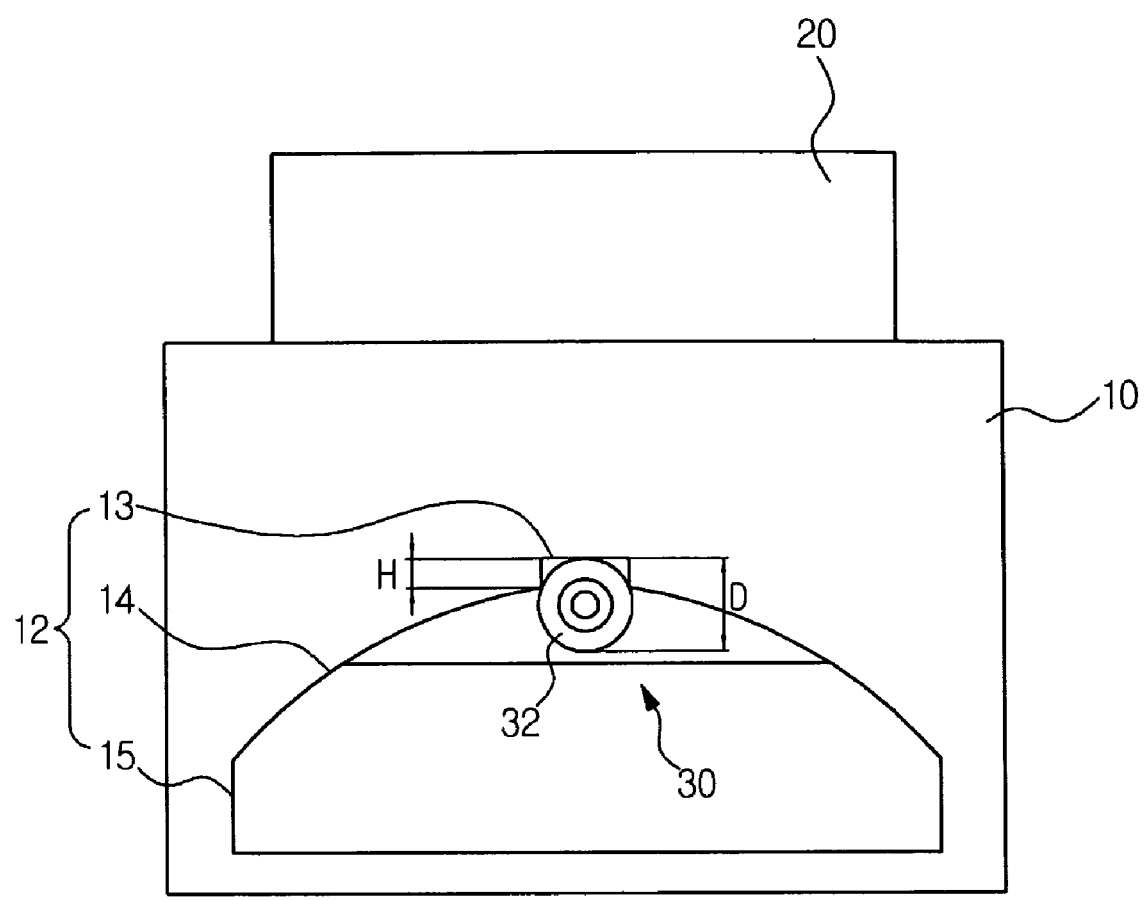
FIG. 3 is a front view illustrating a cam guide unit of a housing of the compliant joint in accordance with the embodiments of the present invention.

FIG. 3 is a front view illustrating the cam guide unit of the housing of the compliant joint in accordance with the embodiments of the present invention.

As shown in FIG. 3, the cam guide units 12 having an approximately semicircular shape are formed on the wall of the housing 10 by cutting, and each of the rollers 32 is disposed opposite to the corresponding cam guide unit 12 such that the roller 32 can roll on the cam guide unit 12.

A landing groove 13, which is depressed to a designated depth, is formed at the central portion of the cam guide unit 12. In the case that the roller 32 is inserted into the landing groove 13, the rotation of the cam 30 is restricted, and thus the rotation of the rotating member 20 connected to the cam 30 by insertion, as shown in FIG. 2, is restricted also. Thereby, the cam 30 maintains the connection of the rotating member 20 and the housing 10, and thus restricts the mutual rotation of the rotating member 20 and the housing 10.

On the other hand, in the case that external force greater than a designated value is applied to the rotating member 20 and thus the cam 30 rotates together with the rotation of the rotating member 20, the rollers 32 are separated from the landing grooves 13. In order to separate the rollers 32 from the landing grooves 13, the depth (H) of the landing grooves 13 must be smaller than the radius (D/2) of the rollers 32. If the depth (H) of the landing grooves 13 is larger than the radius (D/2) of the rollers 32, the rollers 32 cannot be separated from the landing grooves 13.

A rolling part 14 having an arc shape with a bilaterally symmetrical structure with respect to the landing groove 13 is formed. The rolling part 14 has an arc shape, which falls from the upper part to the lower part. Thus, when the roller 32 rolls on the rolling part 14, the roller 32 rotates and moves downward simultaneously. With reference to FIG. 2, it means that the cam 30 rotates and moves downward simultaneously and the rotating member 20 rotates.

The rolling part 14, on which the roller 32 rolls, does not always have the arc shape. In the case that the rolling part 14 has the shape of an oblique line, which is tilted from the upper part to the lower part, when the roller 32 rolls the rolling part 14, the cam 30 rotates and moves downward simultaneously, and the rotating member 20 rotates depending on the rotation of the cam 30.

The rolling part 14 has an arc shape, which falls from the upper part to the lower part, and thus the roller 32 is automatically returned to the landing groove 13. This operation will be described in detail, with reference to FIG. 3.

A stopper 15 is formed at the outermost end of the rolling part 14. In the case that the roller 32 meets the stopper 15, the roller 32 cannot rotate (or move) any more. It means that the rotation of the cam 30 is restricted and the rotation of the rotating member 20, rotating together with the rotation of the cam 30, is restricted, as shown in FIG. 2. The stopper 15 restricts the turning radius of the rotating member 20, and thus prevents secondary damage. That is, in the case that the rotating member 20 rotates continuously without any stopper 15, a robot arm connected to the rotating member 20 may cause a secondary collision with any other obstacle (or person).

Figure 4:
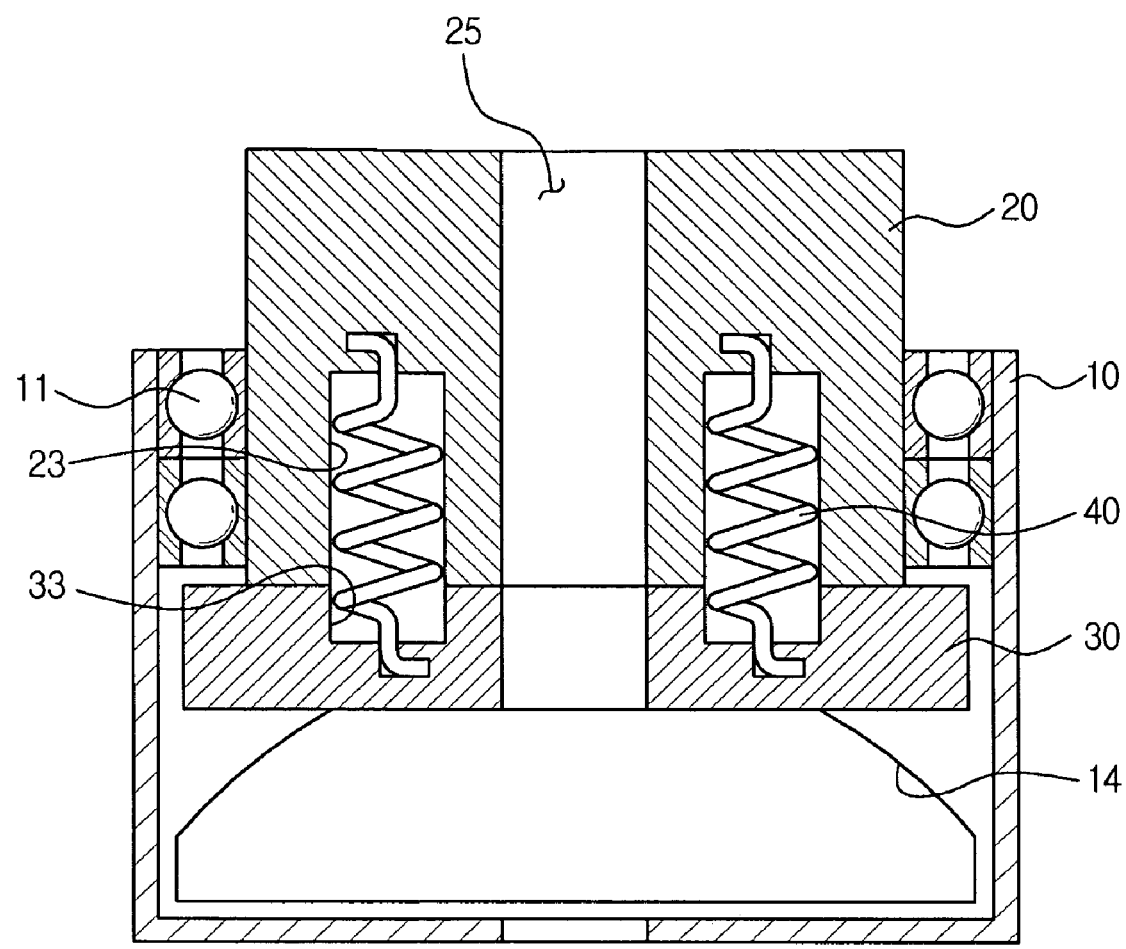
FIG. 4 is a cross-sectional view of a compliant joint in accordance with one embodiment of the present invention, taken along the line B-B of FIG. 1.

FIG. 4 is a cross-sectional view of a compliant joint in accordance with one embodiment, taken along the line B-B of FIG. 1.

As shown in FIG. 4, elastic members, such as compressed coil springs 40, are installed between the rotating member 20 and the cam 30. Grooves 23 are formed into the lower surface of the rotating member 20 upwardly, and grooves 33 are formed into the upper surface of the cam 30 downwardly. The upper ends of the compressed coil springs 40 are inserted into the grooves 23 of the rotating member 20 and thus fixed to the grooves 23, and the lower ends of the compressed coil springs 40 are inserted into the grooves 33 of the cam 30 and thus fixed to the grooves 33. Thereby, the compressed coil springs 40 pull the cam 30 toward the rotating member 20. That is, the compressed coil springs 40 maintain the state of the cam 30, which is closely adhered to the rotating member 20.

Therefore, in order to separate the rollers 32, inserted into the landing grooves 13, as shown in FIG. 3, from the landing grooves 13, the cam 30 overcomes the elastic force of the compressed coil springs 40 and moves downwardly in FIG. 4. Further, when the rollers 32 roll on the rolling parts 14, as shown in FIG. 3, the cam 30 gradually moves downwardly and the interval between the cam 30 and the rotating member 20 increases. Thus, the compressed coil springs 40 are gradually stretched and hold contractile force, which is gradually increased. Consequently, since the compressed coil springs 40 tend to contract due to the rolling part 14 having an arc shape, which falls from the upper part to the lower part, the interval between the cam 30 and the rotating member 20 decreases and the rollers 32 are inserted into the landing grooves 13 again, as shown in FIG. 3. That is, the rollers 32 on the cam guide units 12 are automatically returned to their original positions due to the arc-shaped rolling parts 14 and the compressed coil springs 40.

Figure 5:
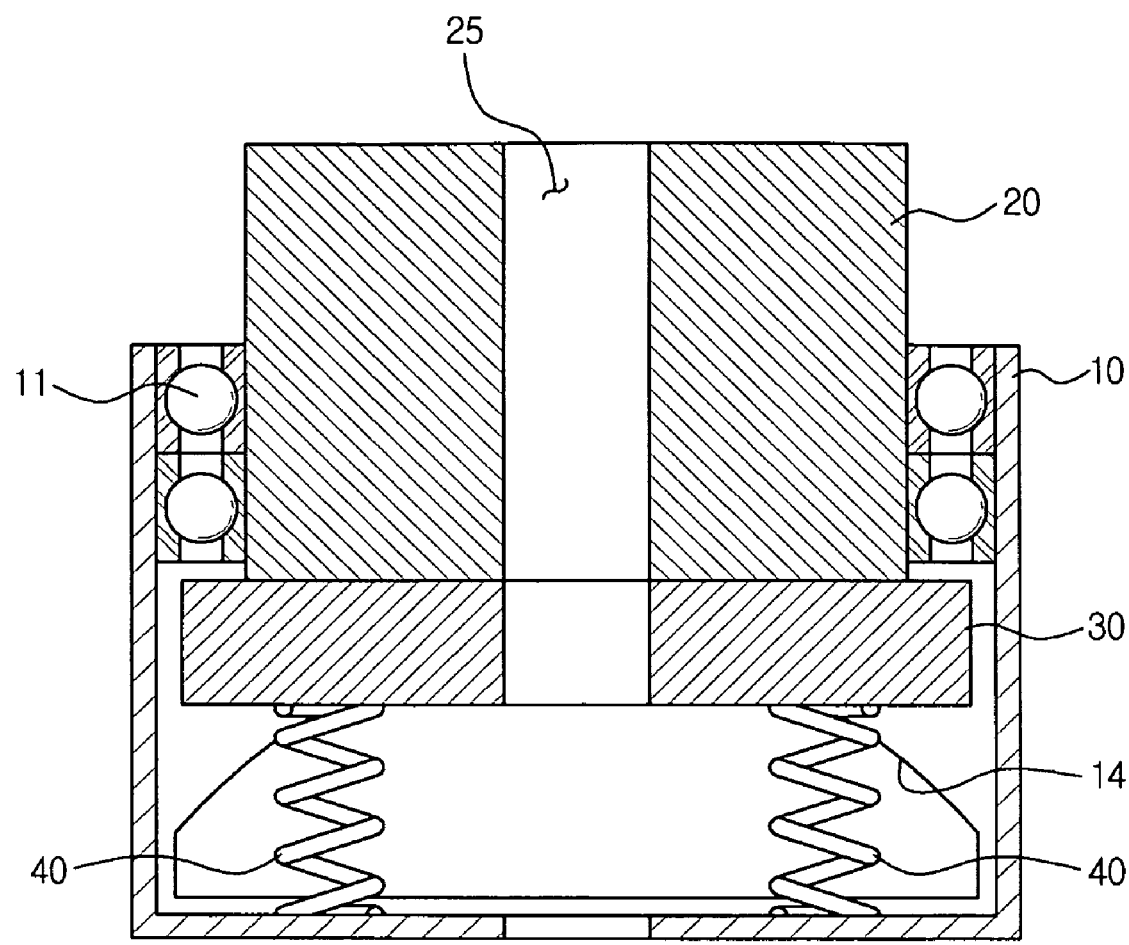
FIG. 5 is a cross-sectional view of a compliant joint in accordance with another embodiment of the present invention, taken along the line B-B of FIG. 1.

FIG. 5 is a cross-sectional view of a compliant joint in accordance with another embodiment, taken along the line B-B of FIG. 1.

In FIG. 5, a rotating member 20 and a cam 30 are installed in a housing 10 in the same manner as FIG. 4. While FIG. 4 illustrates the compressed coil springs 40 installed between the cam 30 and the rotating member 20, FIG. 5 illustrates compressed coil springs 40 installed between the cam 30 and the housing 10. The operating principle of the compliant joint of FIG. 5 is the same as that of the above-described compliant joint of FIG. 4.

Figure 6:
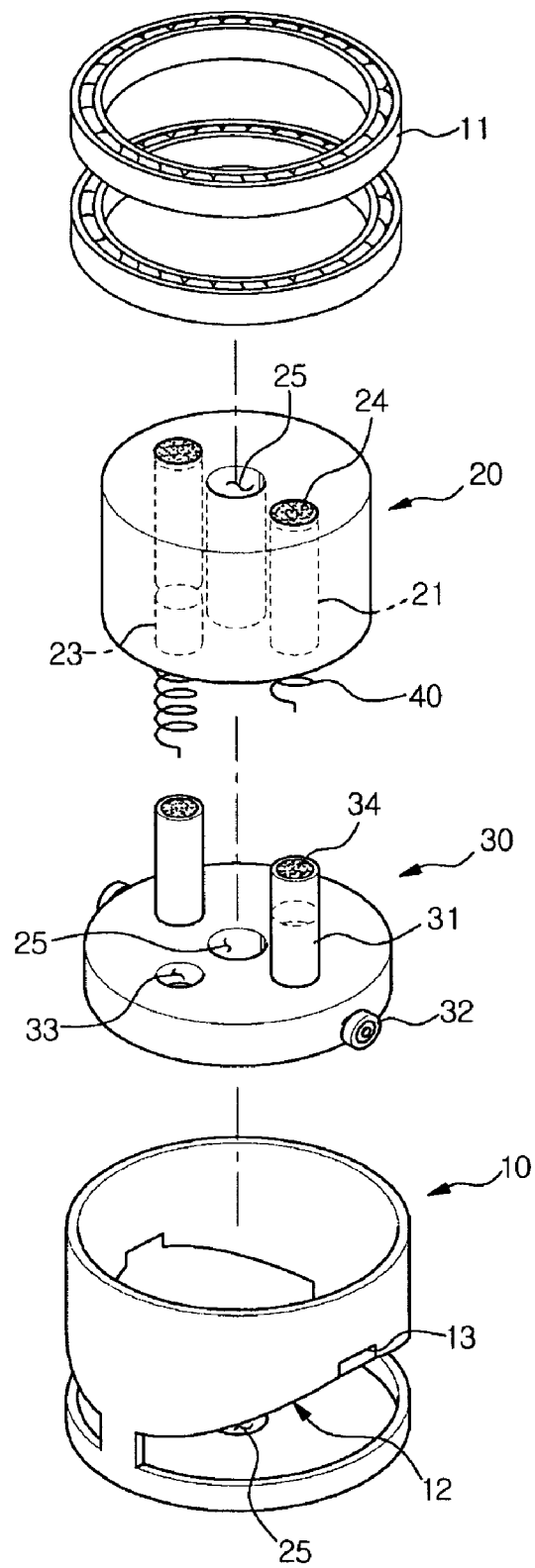
FIG. 6 is an exploded perspective view of the compliant joint in accordance with the embodiments of the present invention.

FIG. 6 is an exploded perspective view of the compliant joint in accordance with the embodiment of the present invention.

With reference to FIG. 6, the bearings 11 are interposed between the housing 10 and the rotating member 20, and thus connect the housing 10 and the rotating member 20 such that the housing 10 and the rotating member 20 can mutually rotate. The connection between the cam 30 and the rotating member 20 is carried out by inserting the transmission shafts 31 into the mounting holes 21. Here, the compressed coil springs 40 are installed between the rotating member 20 and the cam 30, and adhere the cam 30 closely to the rotating member 20. The connection between the cam 30 and the housing 10 is carried out by inserting the rollers 32 into the landing grooves 13 formed on the cam guide units 12.

The compliant joint releases the connection between the rotating member 20 and the housing 10 when external force more than a designated value is applied to the compliant joint, and maintains the connection between the rotating member 20 and the housing 10 when external force below the designated value is applied to the compliant joint. In order to extend a range to which the compliant joint is applied, the compliant joint is configured such that external force more than a designated value to release the connection between the rotating member 20 and the housing 10 can be adjusted.

First, factors affecting the external force more than a designated value required to release the connection between the rotating member 20 and the housing 10 will be described.

With reference to FIG. 3, in order to separate the rollers 32 from the landing grooves 13, external force more than a designated value is required. The smaller the depth (H) of the landing groove is relative to the radius (D/2) of the rollers 32, the smaller the external force for separating the rollers 32 from the landing grooves 13 becomes. Thus, it is possible to regulate the external force required to release the connection between the rotating member 20 and the housing 10 by regulating the ratio of the radius (D/2) of the rollers 32 to the depth (H) of the landing grooves 13.

With reference to FIG. 4, in order to move the cam 30 downwardly, the compressed coil springs 40 must be stretched. When the external force of the same value is applied, the tension length of the compressed coil springs 40 is varied according to a variation of the modulus (K) of elasticity of the compressed coil springs 40. Thus, it is possible to regulate the external force required to release the connection between the rotating member 20 and the housing by regulating the modulus (K) of elasticity of the compressed coil springs 40.

However, the regulation of the ratio of the radius (D/2) of the rollers 32 to the depth (H) of the landing grooves 13 or the modulus (K) of elasticity of the compressed coil springs 40 can be determined in the initial stage of a manufacturing process of the compliant joint. In the case that a bolt is connected to the upper end of each of the springs 40 such that the springs 40 can move up and down on the rotating member 20 by tightening and loosening the bolts, it is possible to regulate the external force required to release the connection between the rotating member 20 and the housing 10 by regulating the deformation degree of the springs 40. However, in this case, a user or a worker needs to directly manipulate the bolts by hand.

Accordingly, a device, which can automatically regulate the external force required to release the connection between the rotating member 20 and the housing 10 while a finished product of the compliant joint is used in a robot arm, is necessary.

As shown in FIGS. 2 and 6, magnets 34 are installed at the upper ends of the transmission shafts 31 of the cam 30, and electromagnets 24 are installed in the mounting holes 21 of the rotating member 20. Through holes 25 are respectively formed through the centers of the rotating member 20, the cam 30, and the housing 10, and electric wires are installed in the through holes 25. The electric wires regulate the intensity of current applied to the electromagnets 24 through a control unit 26. Since the intensity of the magnetic field of the electromagnets 24 is varied according to a variation of the intensity of the current, when the intensity of the current flowing in the electromagnets 24 is increased, the intensity of the magnetic field is increased and the attractive force of the electromagnets 24 with the magnets 34 is increased. It means that the attractive force between the cam 30 and the rotating member 20 is increased, and thus means that the external force required to move the cam 30 downwardly is increased. Therefore, it is possible to regulate the external force required to release the connection between the rotating member 20 and the housing 10 by regulating the intensity of the current flowing in the electromagnets 24 through the control unit 26.

Hereinafter, when external force required to release the connection between the rotating member 20 and the housing is referred to as torque (T) under the condition that the depth (H) of the landing grooves 13, the radius (D/2) of the rollers 32, the modulus (K) of elasticity of the compressed coil springs 40, and the intensity of current flowing in the electromagnets 24 are determined, the operation of the compliant joint will be described.

FIG. 3 illustrates the initial state of the compliant joint. In case that external force below the torque (T) is transmitted to the rotating member 20, the rollers 32 maintain a state, in which the rollers 32 are inserted into the landing grooves 13, and thus the connection between the rotating member 20 and the housing 10 is maintained.

Figure 7:
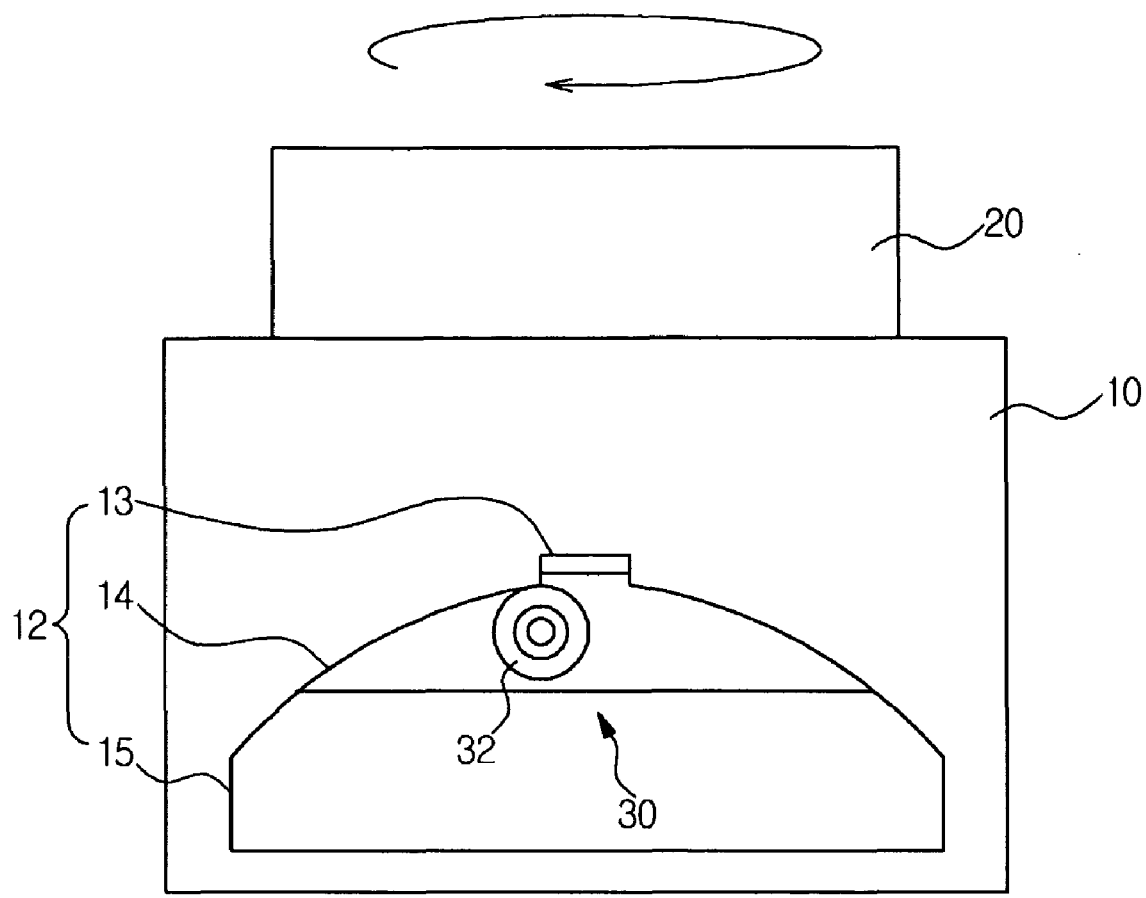
FIG. 7 is a front view illustrating a state of the compliant joint in accordance with the embodiments of the present invention, in which rollers are separated from landing grooves.

FIG. 7 is a front view illustrating a state of the compliant joint, in which the rollers are separated from landing grooves.

As shown in FIG. 7, in case that external force more than the torque (T) is transmitted to the rotating member 20, the rollers 32 are separated from the landing grooves 13. Thereby, the connection between the rotating member 20 and the housing 10 is released, and thus the rotating member 20 can rotate in the housing 10.

Figure 8:
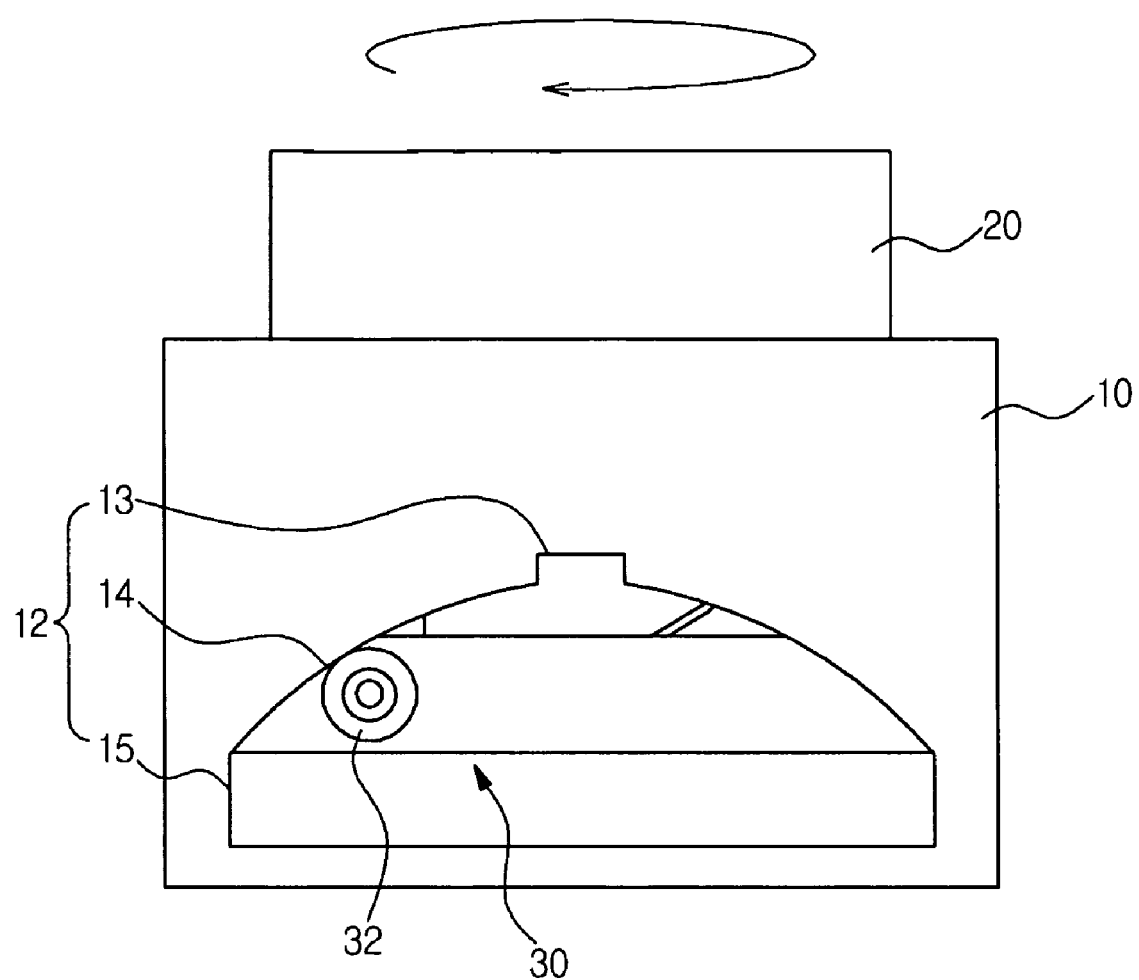
FIG. 8 is a front view illustrating a state of the compliant joint in accordance with the embodiments of the present invention, in which the rollers are put on rolling parts.

FIG. 8 is a front view illustrating a state of the compliant joint, in which the rollers are put on rolling parts.

As shown in FIG. 8, the rollers 32 roll the arc-shaped rolling parts 14, and thus the rotating member 20 freely rotates in the housing 10.

Figure 9:
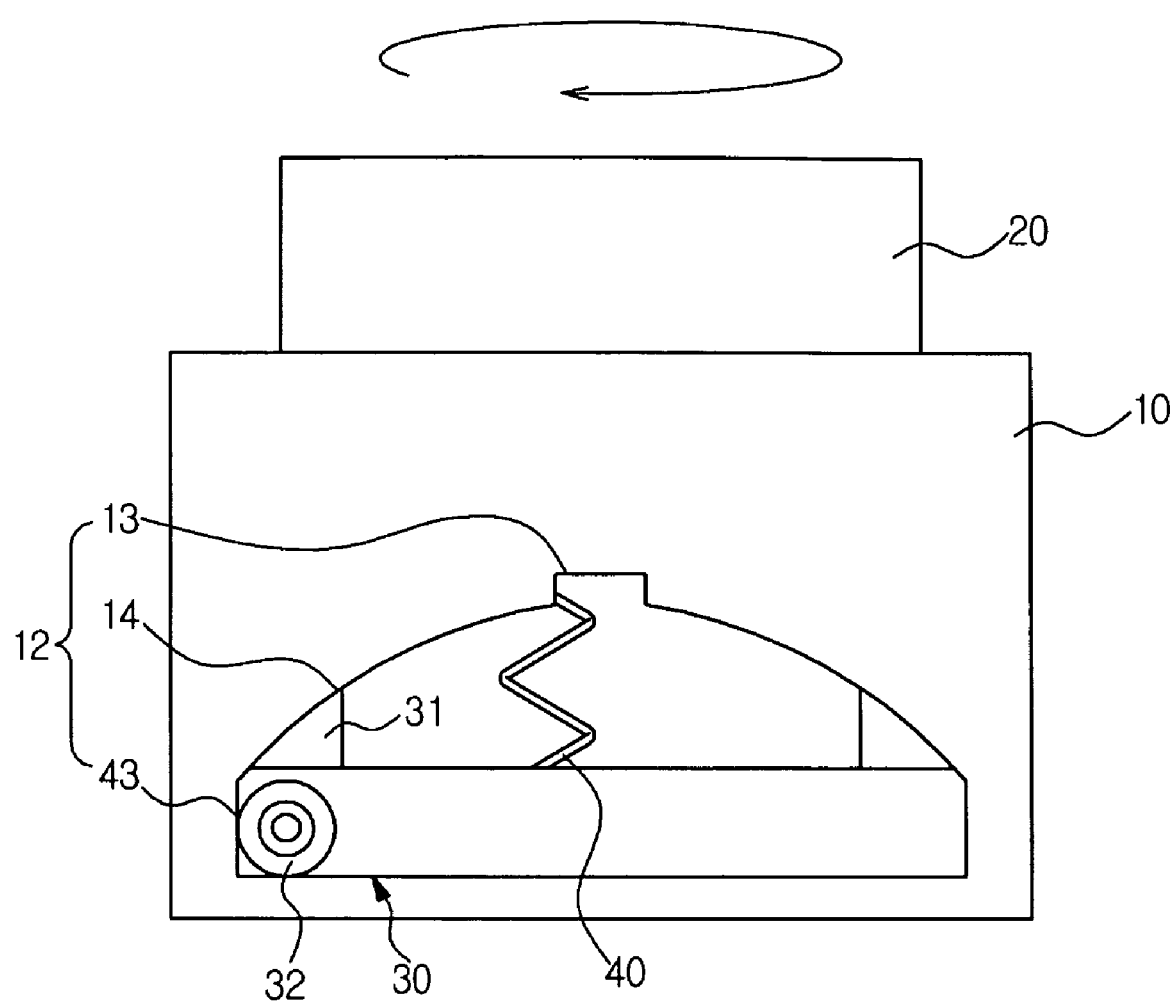
FIG. 9 is a front view illustrating a state of the compliant joint in accordance with the embodiments of the present invention, in which the rollers face stoppers.

FIG. 9 is a front view illustrating a state of the compliant joint, in which the rollers face the stoppers.

As shown in FIG. 9, the rollers 32 cannot continuously roll due to the stoppers 15. Thus, the rotation of the rotating member 20 is stopped. Here, the tension length of the compressed coil springs 40 (with reference to FIG. 4) is maximized, and the contractile force retained by the compressed coil springs 40 is maximized. Then, the rotating member 20 rotates in the opposite direction by the contractile force of the compressed coil springs 40, and the rollers 32 are inserted into the landing grooves 13, as shown in FIG. 3, and thus the connection between the rotating member 20 and the housing 10 is maintained again.

In a robot arm, to which the above compliant joint is applied, in the case that external force below a designated value is transmitted to the rotating member 20, the connection between the rotating member 20 and the housing 10 is maintained and thus rigidity is provided to the robot arm, and in the case that external force more than the designated value is applied to the rotating member 20, the rotating member 20 is disconnected from the housing 10 and thus flexibility is provided to the robot arm.

That is, when the robot arm carries out an operation, rigidity is provided to the robot arm such that the robot arm can correctly carry out the operation, and when the robot arm collides with a person, flexibility is provided to the robot arm such that the robot arm cannot impact the person.

As apparent from the above description, the embodiments of the present invention provide a compliant joint, which achieves passive compliance of a robot arm, thus allowing the robot arm to have a high reaction velocity and removing the danger of errors in the operation of the robot arm.

The compliant joint of the embodiments of the present invention provides rigidity to the robot arm under external force below a designated value and allows the robot arm to control the correct position, thus obtaining the accuracy in the operation of the robot arm.

The compliant joint of the embodiments of the present invention is applied to various robots, such as to a humanoid robot, a service robot for public facilities, an assistance robot for mentally or physically handicapped persons or elderly persons, a home helper robot, a worker supporting robot in a cell-type production line, and a robot interacting with humans in a production line, and thus providing safety to humans.

The compliant joint of the embodiments of the present invention is operated according to the movement of the cam up and down, and thus the diameter of the compliant joint in the lateral direction can be minimized. Accordingly, the compliant joint minimizes the size of products, and is applied to various fields.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A compliant joint comprising:
   a housing;
   a rotating member rotatably installed in the housing; and
   a cam selectively maintaining a connection between the housing and the rotating member or releasing the connection between the housing and the rotating member, wherein:
   the cam is connected to the rotating member such that the cam is dependent on the rotating member to rotate together with the rotation of the rotating member, or is independent of the rotating member to move in an axial direction of the rotating member separately from the rotating member;
   the cam is connected to the housing such that the cam can maintain the connection with the housing if an external force applied to the rotating member is below a designated value, and release the connection with the housing if the external force applied to the rotating member is greater than the designated value;
   elastic members are installed between the cam and the rotating member so as to adhere the cam closely to the rotating member; and
   the cam includes rollers connected to the housing, and the housing includes cam guide units selectively connected to or separated from the rollers.

2. The compliant joint according to claim 1, wherein the cam and the rotating member are connected by insertion.

3. The compliant joint according to claim 2, wherein the cam includes transmission shafts inserted into the rotating member, and the rotating member includes mounting holes receiving the transmission shafts.

4. The compliant joint according to claim 3, wherein the transmission shafts and the mounting holes are respectively separated from the centers of rotation of the cam and the rotating member by a designated distance.

5. The compliant joint according to claim 3, further comprising a plurality of the transmission shafts and the mounting holes.

6. The compliant joint according to claim 1, wherein:
   each of the cam guide units includes a landing groove, into which a corresponding one of the rollers is inserted, so that the rotating member and the housing are connected.

7. The compliant joint according to claim 6, wherein the landing groove includes a designated depth which is smaller than a radius of the rollers.

8. The compliant joint according to claim 1, wherein:
   each of the cam guide units includes a rolling part, on which a corresponding one of the rollers roll to release the connection between the cam and the housing.

9. The compliant joint according to claim 8, wherein the rolling parts of the cam guide units each have an arc shape such that the cam can rotate together with the rotation of the rotating member and move in the axial direction of the rotating member separately from the rotating member.

10. The compliant joint according to claim 1, wherein:
    each of the cam guide units includes a stopper restricting the movement of a corresponding one of the rollers, so that the rotation of the cam is restricted and thus the rotation of the rotating member is restricted.

11. The compliant joint according to claim 1, wherein the elastic members include compressed coil springs.

12. A compliant joint comprising:
    a rotating member;
    a housing; and
    a cam provided between the housing and the rotating member, and connected to the housing and the rotating member respectively, wherein:
    the cam is connected to the rotating member such that the cam can rotate together with rotation of the rotating member and move in an axial direction of the rotating member separately from the rotating member;
    the cam is connected to the housing such that the connection between the cam and the housing can be maintained under an external force below a designated value and be released if the external force is more than the designated value;
    elastic members are installed between the cam and the rotating member so as to adhere the cam closely to the rotating member; and
    the cam includes rollers connected to the housing, and the housing includes cam guide units selectively connected to or separated from the rollers.

13. The compliant joint according to claim 12, wherein the cam includes transmission shafts and the rotating member includes mounting holes, and the cam and the rotating member are connected by inserting the transmission shafts into respective ones of the mounting holes.

14. A compliant joint comprising:
    a housing;
    a rotating member rotatably installed in the housing;
    a cam selectively maintaining a connection between the housing and the rotating member or releasing the connection between the housing and the rotating member;
    electromagnets installed between the cam and the rotating member; and
    a control unit to regulate current applied to the electromagnets so as to regulate external force required to release the connection between the rotating member and the housing, wherein:
    the cam is connected to the rotating member such that the cam is dependent on the rotating member to rotate together with the rotation of the rotating member, or is independent of the rotating member to move in an axial direction of the rotating member separately from the rotating member; and
    the cam is connected to the housing such that the cam can maintain the connection with the housing if an external force applied to the rotating member is below a designated value, and release the connection with the housing if the external force applied to the rotating member is greater than the designated value.

15. A compliant joint comprising:
    a rotating member;
    a housing;
    a cam provided between the housing and the rotating member, and connected to the housing and the rotating member respectively;
    electromagnets installed between the cam and the rotating member; and a control unit to regulate current applied to the electromagnets so as to regulate external force required to release the connection between the rotating member and the housing, wherein:

the cam is connected to the rotating member such that the cam can rotate together with rotation of the rotating member and move in an axial direction of the rotating member separately from the rotating member; and the cam is connected to the housing such that the connection between the cam and the housing can be maintained under an external force below a designated value and be released if the external force is more than the designated value.

16. A compliant joint comprising:

a housing;

a rotating member rotatably installed in the housing; and a cam selectively maintaining a connection between the housing and the rotating member or releasing the connection between the housing and the rotating member, wherein:

the cam is connected to the rotating member such that the cam is dependent on the rotating member to rotate together with the rotation of the rotating member, or is independent of the rotating member to move in an axial direction of the rotating member separately from the rotating member;

the cam is connected to the housing such that the cam can maintain the connection with the housing if an external force applied to the rotating member is below a designated value, and release the connection with the housing if the external force applied to the rotating member is greater than the designated value;

the cam includes rollers connected to the housing, and the housing includes cam guide units selectively connected to or separated from the rollers;

each of the cam guide units includes a rolling part, on which a corresponding one of the rollers roll to release the connection between the cam and the housing; and the rolling parts of the cam guide units each have an arc shape such that the cam can rotate together with the rotation of the rotating member and move in the axial direction of the rotating member separately from the rotating member.

17. A compliant joint comprising:

a rotating member;

a housing; and a cam provided between the housing and the rotating member, and connected to the housing and the rotating member respectively, wherein:

the cam is connected to the rotating member such that the cam can rotate together with rotation of the rotating member and move in an axial direction of the rotating member separately from the rotating member;

the cam is connected to the housing such that the connection between the cam and the housing can be maintained under an external force below a designated value and be released if the external force is more than the designated value;

the cam includes rollers connected to the housing, and the housing includes cam guide units selectively connected to or separated from the rollers;

each of the cam guide units includes a rolling part, on which a corresponding one of the rollers roll to release the connection between the cam and the housing; and the rolling parts of the cam guide units each have an arc shape such that the cam can rotate together with the rotation of the rotating member and move in the axial direction of the rotating member separately from the rotating member.

* * * * *